United States Patent
Zarbakhsh et al.

(10) Patent No.: US 12,146,022 B2
(45) Date of Patent: Nov. 19, 2024

(54) POLYOL COMPONENTS AND USE THEREOF FOR THE PRODUCTION OF RIGID POLYURETHANE FOAMS

(71) Applicant: BASF SE, Ludwigshafen am Rhein (DE)

(72) Inventors: Sirus Zarbakhsh, Ludwigshafen (DE); Johann Klassen, Lemfoerde (DE); Mark Elbing, Gross Groenau (DE)

(73) Assignee: BASF SE, Ludwigshafen am Rhein (DE)

( * ) Notice: Subject to any disclaimer, the term of this patent is extended or adjusted under 35 U.S.C. 154(b) by 201 days.

(21) Appl. No.: 16/497,673

(22) PCT Filed: Mar. 23, 2018

(86) PCT No.: PCT/EP2018/057479
§ 371 (c)(1),
(2) Date: Sep. 25, 2019

(87) PCT Pub. No.: WO2018/177941
PCT Pub. Date: Oct. 4, 2018

(65) Prior Publication Data
US 2020/0048400 A1   Feb. 13, 2020

(30) Foreign Application Priority Data

Mar. 27, 2017   (EP) .................... 17163074

(51) Int. Cl.
| | | |
|---|---|---|
| C08G 18/48 | (2006.01) | |
| C08G 18/50 | (2006.01) | |
| C08G 18/66 | (2006.01) | |
| C08G 18/76 | (2006.01) | |
| C08G 65/26 | (2006.01) | |
| C08J 9/14 | (2006.01) | |

(52) U.S. Cl.
CPC ....... *C08G 18/4816* (2013.01); *C08G 18/482* (2013.01); *C08G 18/4829* (2013.01); *C08G 18/4883* (2013.01); *C08G 18/5033* (2013.01); *C08G 18/6674* (2013.01); *C08G 18/7664* (2013.01); *C08G 2110/0025* (2021.01)

(58) Field of Classification Search
CPC .............................. C08G 2110/0025
See application file for complete search history.

(56) References Cited

U.S. PATENT DOCUMENTS

| | | | |
|---|---|---|---|
| 5,786,400 A | 7/1998 | Brock et al. | |
| 2006/0100295 A1 | 5/2006 | Heraldo et al. | |
| 2007/0232712 A1 | 10/2007 | Emge et al. | |
| 2007/0259981 A1 | 11/2007 | Eling et al. | |
| 2011/0218324 A1* | 9/2011 | Zarbakhsh | C07C 41/03 528/425 |
| 2012/0022179 A1 | 1/2012 | Emge et al. | |
| 2012/0259030 A1* | 10/2012 | Kunst | C08G 18/1808 521/164 |
| 2012/0264842 A1* | 10/2012 | Tomovic | C08G 18/6674 521/129 |
| 2013/0046037 A1* | 2/2013 | Emge | C08G 18/636 521/112 |

FOREIGN PATENT DOCUMENTS

| | | |
|---|---|---|
| CN | 1176968 | 3/1998 |
| CN | 1298789 | 6/2001 |
| CN | 100999566 | 7/2007 |
| CN | 102766247 | 11/2012 |
| CN | 103665297 A | 3/2014 |
| CN | 104017154 A | 9/2014 |
| CN | 104448230 A | 3/2015 |
| CN | 105199071 | 12/2015 |
| EP | 0 395 316 A2 | 10/1990 |
| EP | 0 533 023 A1 | 3/1993 |
| EP | 0 872 501 A2 | 10/1998 |
| EP | 1 138 709 A1 | 10/2001 |
| EP | 1 894 955 A1 | 3/2008 |
| EP | 2 542 612 A1 | 1/2013 |
| EP | 2 563 833 B1 | 3/2013 |
| GB | 2 206 123 A | 12/1988 |
| WO | WO 02/50161 A2 | 6/2002 |
| WO | WO 03/089505 A1 | 10/2003 |
| WO | WO 2005/066233 A2 | 7/2005 |
| WO | WO 2006/037540 A2 | 4/2006 |
| WO | WO 2006/042674 A1 | 4/2006 |
| WO | WO 2010/084058 A1 | 7/2010 |
| WO | WO 2011/039082 A1 | 4/2011 |
| WO | WO 2011/107374 A1 | 9/2011 |
| WO | WO 2011/134866 A2 | 11/2011 |
| WO | WO 2012/119970 A2 | 9/2012 |
| WO | WO 2012/126916 A2 | 9/2012 |
| WO | WO 2012/136608 A1 | 10/2012 |
| WO | WO 2013/016263 A2 | 1/2013 |

OTHER PUBLICATIONS

International Search Report issued Jun. 4, 2018 in PCT/EP2018/057479, 3 pages.
Technical Data Sheet CAS No. 9049-71-2 35176-06-8 Carpol® SPA-357, Carpenter Co. Chemicals Division, Retrieved from the internet: http://carpenter.com/docs/chemicals/amines/TDS/SPA-357.pdf , May 2015, 2 pages.
U.S. Appl. No. 15/771,533, filed Apr. 27, 2018, US2018-346636 A1, Sebastian Koch, et al.
U.S. Appl. No. 15/576,370, filed Apr. 19, 2016, US2018-155487 A1, Iran Otero Martinez, et al.

(Continued)

*Primary Examiner* — Melissa A Rioja
(74) *Attorney, Agent, or Firm* — Grüneberg and Myers PLLC

(57) ABSTRACT

This invention relates to a polyol component P), to a process for preparing rigid polyurethane foams by using said polyol component P) and also to the rigid polyurethane foams themselves.

10 Claims, No Drawings

(56) References Cited

OTHER PUBLICATIONS

U.S. Appl. No. 16/480,578, filed Jul. 24, 2019, Christine Rolfsen, et al.
U.S. Appl. No. 16/497,673, filed Sep. 25, 2019, Sirus Zarbakhsh, et al.

* cited by examiner

POLYOL COMPONENTS AND USE THEREOF FOR THE PRODUCTION OF RIGID POLYURETHANE FOAMS

This invention relates to a polyol component P), to a process for preparing rigid polyurethane foams by using said polyol component P) and also to the rigid polyurethane foams themselves.

Rigid polyurethane (PU) foams are obtainable in a known manner by reacting organic polyisocyanates with one or more compounds having two or more reactive hydrogen atoms, preferably polyether and/or polyester alcohols (polyols), in the presence of blowing agents, catalysts and optionally auxiliaries and/or added-substance materials.

The isocyanate-based production of rigid PU foams typically utilizes polyols having high functionalities and a low molecular weight in order to ensure a very high degree of crosslinking for the foams. The preferably employed polyether alcohols usually have a functionality of 4 to 8 and a hydroxyl number in the range between 300 to 600, in particular between 400 and 500 mg KOH/g. It is known that polyols having a very high functionality and hydroxyl numbers in the range between 300 and 600 mg KOH/g have a very high level of viscosity. It is further known that such polyols are comparatively polar and thus have poor solubility for customary blowing agents, in particular hydrocarbons such as pentanes, in particular cyclopentane. To remedy this defect, polyether alcohols having functionalities of 2 to 4 and hydroxyl numbers of 100 to 250 mg KOH/g are frequently added to the polyol component.

It is also known that the flowability (expressed by the flow factor FF=minimum fill density/free rise density of the reaction mixture comprising isocyanate and polyether alcohol) is not always satisfactory on use of polyol components based on high-functionality, polar polyols. But EP-A 1 138 709 discloses how reaction mixtures comprising isocyanate and polyol are obtainable with high flowability provided the polyol component comprises at least one polyether alcohol having a hydroxyl number of 100 to 250 mg KOH/g and obtained by addition of alkylene oxides onto H-functional starter molecules having 2 to 4 active hydrogen atoms, in particular glycols, trimethylolpropane, glycerol, pentaerythritol or vic-tolylenediamine (vic-TDA).

EP 2 563 833 B1 describes a process for preparing polyurethanes, preferably foamed polyurethane materials, especially rigid polyurethane foams, by reaction of a) polyisocyanates with b) compounds having two or more isocyanate-reactive hydrogen atoms, characterized in that the compounds having two or more isocyanate-reactive hydrogen atoms b) comprise at least one polyether alcohol b1) obtained by reacting an aromatic amine b1a) with propylene oxide by using an amine b1b) other than b1a) as a catalyst, wherein the alkylene oxide used to prepare said polyether alcohol b1) comprises not only propylene oxide but also 0 to 10 wt %, based on the weight of the alkylene oxides, of ethylene oxide. This is said to provide polyurethane foams by use of polyols that combine a low viscosity of the liquid starting components with good processing properties.

WO 2011/134866 A2 describes a process for preparing polyether alcohols by addition reaction of alkylene oxides onto H-functional starter compounds, especially onto aromatic amines. The problem addressed in WO 2011/134866 A2 was that of developing polyether alcohols on the basis of aromatic amines, especially TDA, where propylene oxide is essentially the only alkylene oxide used in the synthesis. More particularly, these polyether alcohols were to have a low viscosity and a low level of unconverted aromatic amines used as starter compounds. It was surprisingly found that the use of amine catalysts leads to the preparation of polyols on the basis of aromatic amines, especially TDA, that are low in viscosity and comprise but propylene oxide as alkylene oxide. Imidazole was an exemplified amine catalyst.

The use of rigid PU foams in the refrigeration sector turns on their demolding behavior. Good demolding behavior is characterized, for example, by as low as possible a postexpansion of the cured rigid PU foam. That is not yet adequately ensured by the prior art.

The problem addressed by the present invention is that of providing highly functional polyols, especially sugar polyols, in order to generate rigid polyurethane foam systems that have improved properties. More particularly, the highly functional polyols are to provide improved demolding properties and consequently low postexpansion in the production of rigid polyurethane foams.

The problem is solved by a polyol component P) comprising:
a) at least one polyether polyol A) having a functionality in the range from 5.7 to 6.4 and an OH number in the range from 300 to 500 mg KOH/g, comprising units based on the monomers selected from the group consisting of
   ai) sucrose,
   aii) monopropylene glycol, diethylene glycol, triethylene glycol, dipropylene glycol, glycerol or mixtures thereof,
   aiii) propylene oxide,
   or mixtures of ai), aii) and/or aiii),
b) at least one polyether polyol B) having a functionality in the range from 3.0 to 5.0 and an OH number in the range from 300 to 500 mg KOH/g, comprising units based on the monomers selected from the group consisting of
   bi) 2,3-, 3,4-, 2,4-, 2,5-, 2,6-tolylenediamine or mixtures thereof,
   bii) propylene oxide,
   or mixtures of bi) and bii),
c) at least one polyether polyol C) having a functionality in the range from 3.0 to 5.0 or 2.8 to 3.0 and an OH number in the range from 100 to 290 mg KOH/g, comprising units based on the monomers selected from the group consisting of
   ci) amines comprising ethylenediamine, 1,3-propylenediamine, 1,3-, 1,4-butylenediamine, 1,2-, 1,3-, 1,4-, 1,5-, 1,6-hexamethylenediamine, phenylenediamines, 2,3-, 3,4-, 2,4-, 2,5-, 2,6-tolylenediamine and 4,4'-, 2,4'-, 2,2'-diaminodiphenylmethane or mixtures thereof, polyols comprising glycerol, trimethylolpropane, monopropylene glycol, diethylene glycol, triethylene glycol, dipropylene glycol (2,2'-oxydi-1-propanol, 1,1'-oxydi-2-propanol, 2-(2-hydroxypropoxy)-1-propanol) or mixtures thereof,
   cii) alkylene oxides comprising ethylene oxide, propylene oxide, butylene oxide or mixtures thereof,
   or mixtures of ci) and cii).

The problem is further solved by a process for preparing rigid polyurethane foams by reaction of:
I) organic or modified organic di- or polyisocyanates PI) or mixtures thereof with
II) an invention polyol component P) whereto a blowing agent F) was added.

The problem is likewise solved by a rigid polyurethane foam obtainable by the process of the invention and also by the use of polyol component P) of the invention in the production of rigid polyurethane foams.

The problem is likewise solved by the use of the polyurethane foam obtained by the process of the invention for insulation and refrigeration applications.

The OH number (hydroxyl number) is quantifiable via commonplace methods. The OH number is quantifiable to DIN 53240 (1971-12) for example.

For the purposes of the present invention, the functionality of a polyether polyol, especially that of the invention polyether polyol A), is to be understood as meaning the number of hydrogen atoms per mol of starter compound, or per mol of the mixture of starter compounds, that are reactive with alkylene oxide as at the time before the time of the alkylene oxide feed. The time of the alkylene oxide feed is in turn the time of commencing the admixture of the alkylene oxide component to the starter compound(s). The computation takes account of all the alkylene oxide-reactive hydrogen atoms that are present in the starter mixture and are attached to starter compound(s).

The functionality F within the meaning of the present invention is computed by the following formula:

$$F = \frac{\sum_{i=1}^{m} n_i * f_i}{\sum_{i=1}^{m} n_i}$$

$n_i$=mol of starter i
$f_i$=functionality of starter i
m=number of starters in starter mix
F=functionality As an example, the computation is as follows for a mixture of two starter compounds (and must be correspondingly expanded for more components):

F=(mol of starter compound A*functionality of starter compound A+mol of starter compound B*functionality of starter compound B)/(mol of starter A+mol of starter B)

For instance, a polyether polyol has a functionality of 5.12 when 626.48 mol of glycerol (functionality 3), 559.74 mol of sucrose (functionality 8) and 67.31 mol of dimethylethanolamine (functionality 1) are used.

The functionality of polyether polyols which is defined above for the purposes of the present invention, especially the functionality of invention polyether polyol A), can differ from the functionality after the reaction commencement, during the reaction of at least one alkylene oxide with a starter compound or of the reaction product because by-products such as glycols and unsaturated monofunctional constituents are formed during the reaction. The by-productive reactions are literature known.

The terms "polyol component" and "polyol" are used interchangeably for the purposes of the present invention. A polyol within the meaning of the present invention is an organic compound having one or more than one OH group. More particularly, a polyol within the meaning of the present invention may be an organic compound having from 1 to 20 OH groups. A polyol according to the present invention is preferably an organic compound having from 2 to 10 OH groups, especially from 2 to 8 OH groups.

A polyether polyol within the meaning of the present invention may preferably be an organic compound having ether and OH groups as functional groups. More particularly, a polyether polyol may be a polymer having a number average polymer mass ($M_n$) in the range from 100 to 6000 g/mol, especially in the range from 200 to 6000 g/mol, preferably in the range from 300 to 2000 g/mol. The number average is quantified according to known methods, for example the method of viscosity measurement.

For the purposes of the present invention, the stated ranges preferably include the limits. Therefore, for example, the range from 5.2 to 6.4 does include the values of 5.2 and 6.4.

The polyether polyols A), B) and C) according to the present invention are preferably different, while two versions are contemplated as preferable for component C). The polyether polyols A), B) and C) may differ for instance in their construction and/or in their polymer mass ($M_n$).

None of polyether polyols A), B) and C) preferably comprises a polyetherester polyol.

Polyether polyols A)

The polyol component P) comprises at least or precisely one polyether polyol A) having a functionality in the range from 5.7 to 6.4 and an OH number in the range from 300 to 500 mg KOH/g.

The polyol component P) may similarly also comprise two or more polyether polyols A). In consequence, the polyether polyols A) may differ in their construction and/or may have a different number average polymer mass ($M_n$).

The functionality of polyether polyol A) is preferably in the range from 5.7 to 6.3, more preferably in the range from 5.7 to 6.1, yet more preferably in the range from 5.9 to 6.1 and most preferably in the range from 5.95 to 6.05.

The functionality range defined for polyether polyol A) improves the demolding of rigid polyurethane foams. Moreover, the polyether polyols A) have advantageous viscosity properties in processing, especially during the production of rigid polyurethane foams.

Similarly, the OH number of polyether polyol A) is preferably in the range from 340 to 450 mg KOH/g and most preferably in the range from 400 to 450 mg KOH/g. This provides improved demolding during the production of rigid PU foams.

In a further preferred embodiment, the polyether polyol A) has a functionality in the range from 5.7 to 6.1 and an OH number in the range from 340 to 450 mg KOH/g, especially a functionality in the range from 5.9 to 6.1 and an OH number in the range from 340 to 450 mg KOH/g.

The polyether polyols A) used according to the present invention are prepared by addition reaction of alkylene oxides onto compounds having two or more hydrogen atoms reactive with alkylene oxides—known herein as starter compounds or starters—by using a catalyst. This reaction is known per se to a person skilled in the art.

The catalysts used for preparing the polyether polyols A) are usually basic compounds. They are usually the hydroxides of alkali metals, e.g., sodium hydroxide, cesium hydroxide or especially potassium hydroxide, in commercial scale processes. Similarly, alkali metal alkoxides, e.g., sodium methoxide, sodium methoxide, potassium methoxide or potassium isopropoxide, are known for use as catalysts. The preparation may likewise be effected under amine catalysis.

The amines are preferably selected from the group comprising trialkylamines, especially trimethylamine, triethylamine, tripropylamine, tributylamine, dimethylalkylamines, especially dimethylethanolamine, dimethylcyclohexylamine, dimethylethylamine, dimethylbutylamine, aromatic amines, especially dimethylaniline, dimethylaminopyridine, dimethylbenzylamine, pyridine, imidazoles (especially imidazole, 4(5)-methylimidazole, 3-methylimidazole, 1-hydroxypropylimidazole), guanidines, amidines, especially 1,5-diazobicylco[4.3.0]-non-5-ene, 1,5-diazabicylo[5.4.0]undec-7-ene. The catalyst is preferably dimethylethanolamine. The catalyst is most preferably an imidazole.

The addition reaction of the alkylene oxides is preferably carried out at a temperature between 90 and 150° C. and a pressure between 0.1 to 8 bar. The feed of the alkylene oxides is customarily followed by a postreaction phase in which the alkylene oxide fully reacts. Thereafter a postreaction phase may follow if necessary. This is typically followed by distillation to remove volatile constituents, preferably in vacuo.

Especially with the use of solid starter compounds, for example sucrose, for preparing the invention polyether polyol A), but slow rates of metering are possible at the start of the process, since the alkylene oxide is but slow to dissolve in the reaction mixture and leads to slow rates of reaction. In addition, the high viscosity created by use of solid starter compounds in the starter mixture is responsible for a worse dissipation of heat. This can lead to local overheating, which has an adverse effect on product quality. The high viscosity moreover accelerates the wear of pumps and heat exchangers. Admixing at least one polyol to the starter mixture is a way to reduce the adverse effects. This is described in EP 2542612 for example. In some of the tests described, therefore, the mixtures of the starter compounds were admixed with polyetherols in order to reduce the viscosity of the starting mixture and provide better process control. Two polyetherols are preferably used according to the invention: polyol H is a sucrose/glycerol-started propoxylate having a molar mass of 488 g/mol and a functionality of 4.3; polyol I is sucrose/glycerol-started with a molecular weight of 639 g/mol and a functionality of 5.1. Admixing the polyether alcohols to the starter mixture is primarily designed to simplify process control.

The functionality of invention polyether polyol A) is computed taking appropriate account of the abovementioned polyols H and/or I.

A suitable polyether polyol A) preferably comprises the reaction product, more particularly the polyether polyol A) consists of the reaction product, of
  i) 10 to 60 wt % of the hydroxyl-containing starter compound, and
  ii) 40 to 90 wt % of at least the alkylene oxide, plus any catalyst.

Starter compound comprehends starter compounds as well as starter compound.

The starter compounds of component i) are selected such that the functionality of component i) is in the range from 5.7 to 6.4, preferably 5.7 to 6.3, more preferably in the range from 5.7 to 6.1, yet more preferably in the range from 5.9 to 6.1 and most preferably in the range from 5.95 to 6.05.

Very particular preference is given to mixtures of sucrose and at least one compound selected from: glycerol, diethylene glycol and dipropylene glycol. A mixture of sucrose and glycerol is very particularly preferred.

The proportion of starter compounds i) in relation to the polyether polyol used according to the invention, polyether polyol A), is generally in the range from 20 to 45 wt %, preferably in the range from 25 to 42 wt %, more preferably in the range from 30 to 40 wt % and most preferably in the range from 33 to 38 wt %, based on the weight of polyether polyol A).

A suitable polyether polyol A) more preferably comprises the reaction product—a polyether polyol A) more particularly consists of the reaction product—of
  ai) 5 to 90 wt % of sucrose,
  aii) 5 to 80 wt % of the polyol other than ai),
  aiii) 5 to 90 wt % of at least one alkylene oxide,
  wherein the sum total of ai), aii) and/or aiii) adds up to 100 wt %, plus any catalyst such as imidazole.

A suitable polyether polyol A) yet more preferably comprises the reaction product—a polyether polyol A) more particularly consists of the reaction product—of
  ai) 5 to 90 wt % of at least one carbohydrate, preferably glucose, mannitol, sucrose, pentaerythritol, sorbitol,
  aii) 5 to 80 wt % of at least one polyol, preferably glycerol, monopropylene glycol, diethylene glycol, triethylene glycol, dipropylene glycol (2,2'-oxydi-1-propanol, 1,1'-oxydi-2-propanol, 2-(2-hydroxypropoxy)-1-propanol),
  aiii) 5 to 90 wt % of at least one alkylene oxide, preferably propylene oxide and/or ethylene oxide,
wherein the sum total of ai), aii), and/or aiii) adds up to 100 wt %, and optionally catalyst such as imidazole in addition.

The catalyst is optionally used in addition to components ai), aii), aiii).

Dipropylene glycol for the purposes of the present invention comprehends 2,2'-oxydi-1-propanol, 1,1'-oxydi-2-propanol, 2-(2-hydroxypropoxy)-1-propanol.

Polyether Polyols B)

The polyol component P) comprises at least one polyether polyol B).

More particularly, the polyol component P) may comprise one or more polyether polyols B). As a consequence, the polyether polyols B) may differ in their construction and/or may have a different number average polymer mass ($M_n$).

The functionality of polyether polyol B) is preferably in the range from 3.0 to 5.0, more preferably in the range from 3.5 to 4.5 and yet more preferably in the range from 3.8 to 4.0 or equal to about 4.0.

Similarly, the OH number of polyether polyol B) is preferably in the range from 300 to 500 mg KOH/g and most preferably in the range from 380 to 450 mg KOH/g.

Preferred starter compounds are vicinal TDA or nonvicinal TDA, e.g., 2,3- and/or 3,4-tolylenediamine or mixtures with, for example, 50 to 80 wt % of vicinal TDA.

Polyether Polyols C)

The polyol component P) comprises at least one polyether polyol C).

The polyol component P) may more particularly comprise one or more polyether polyols C). As a consequence, the polyether polyols C) may differ in their construction and/or may have a different number average polymer mass ($M_n$).

The functionality of polyether polyol C) is preferably in the range from 3.0 to 5.0 or more preferably in the range from 3.5 to 4.5 or from 3.5 to 4.0 or from 2.8 to 3.0.

In one embodiment of the invention, therefore, the functionality is in the range from 3.0 to 5.0 or from 3.1 to 5.0.

In a further embodiment of the invention, therefore, the functionality is in the range from 2.8 to 3.0 or from 2.8 to below 3.0.

Similarly the OH number of the polyether polyol C) is in the range from 100 to 290 mg KOH/g and most preferably in the range from 150 to 200 mg KOH/g.

The starter compounds for the polyether polyols C) used according to the invention are generally selected such that the functionality thereof is in the range from 3.0 to 5.0, preferably from 3.5 to 4.5 or from 2.8 to 3.0. A mixture of suitable starter molecules is optionally employed.

Useful starter compounds for the polyether polyols C) include for example: aliphatic and aromatic diamines, such as ethylene diamine, 1,3-propylenediamine, 1,3-butylenediamine, 1,4-butylenediamine, 1,2-, 1,3-, 1,4-, 1,5- and 1,6-hexamethylenediamine, phenylenediamines, 2,3-, 3,4-, 2,4-, 2,5- and 2,6-tolylenediamine and 4,4'-, 2,4'- and 2,2'-diaminodiphenylmethane.

Particular preference is given to the abovementioned primary diamines, especially at least partly vicinal TDA (vic-TDA) such as, for example, 2,3- and/or 3,4-tolylenediamine.

Useful starter compounds for polyether polyol C) also include polyols. The polyols are preferably selected from the group consisting of glycerol, trimethylolpropane, monopropylene glycol, diethylene glycol, triethylene glycol, dipropylene glycol (2,2'-oxydi-1-propanol, 1,1'-oxydi-2-propanol, 2-(2-hydroxypropoxy)-1-propanol), glycols such as ethylene glycol, propylene glycol and mixtures thereof. Glycerol is very particularly preferred.

Suitable alkylene oxides for the polyether polyols C) used according to the invention are for example selected from the group consisting of ethylene oxide, propylene oxide, 1,2-butylene oxide, 2,3-butylene oxide and mixtures thereof. Alkylene oxides are usable singly, alternatingly in succession or as mixtures.

Propylene oxide and/or ethylene oxide are preferred alkylene oxides for preparing the polyether polyol C), mixtures of ethylene oxide and propylene oxide at >50 wt % of propylene oxide are particularly preferred, purely propylene oxide is very particularly preferred.

The polyether polyols B) and C) used according to the invention are obtainable by known methods, for example by anionic polymerization with alkali metal hydroxides, e.g., sodium hydroxide or potassium hydroxide, or alkali metal alkoxides, e.g., sodium methoxide, sodium methoxide, potassium methoxide or potassium isopropoxide, as catalysts or by cationic polymerization with Lewis acids, such as antimony pentachloride, boron fluoride etherate and so on or fuller's earth, as catalysts from one or more alkylene oxides having 2 to 4 carbon atoms in the alkylene moiety. Said preparation may likewise be effected under imidazole catalysis or by use of trimethylamine or N,N-dimethylcyclohexylamine.

Polyol component P) preferably comprises:
a) the polyether polyol A) having a functionality in the range from 5.7 to 6.4 and an OH number in the range from 300 to 500 mg KOH/g,
b) the polyether polyol B) having a functionality in the range from 3.0 to 5.0 and an OH number in the range from 300 to 500 mg KOH/g,
c) at least one polyether polyol C) having a functionality in the range from 3.0 to 5.0 or 2.8 to 3.0 and an OH number in the range from 100 to 290 mg KOH/g,
d) at least one catalyst D),
e) at least one auxiliary and/or added substance E), and
f) optionally at least one blowing agent F).

Catalysts D)

polyol component P) of the present invention may comprise at least a catalyst D).

Compounds used as catalysts D) are particularly compounds having a substantial speeding effect on the reaction of the polyol component P) ingredients polyether polyols A), B) and C) with the organic, optionally modified di- and/or polyisocyanates G) as per the hereinbelow described process of the present invention.

The compounds used as catalysts D) are advantageously polyurethane catalysts of the basic type, for example tertiary amines, such as triethylamine, tributylamine, dimethylbenzylamine, dicyclohexylmethylamine, dimethylcyclohexylamine, bis(2-dimethylaminoethyl) ether, bis(dimethylaminopropyl)urea, N-methylmorpholine, N-ethylmorpholine, N-cyclohexyl-morpholine, N,N,N',N'-tetramethylethylenediamine, N,N,N,N-tetramethylbutanediamine, N,N,N,N-tetramethylhexane-1,6-diamine, pentamethyldiethylenetriamine, dimethylpiperazine, N-dimethylaminoethylpiperidine, 1,2-dimethylimidazole, 1-azabicyclo(2.2.0)octane, 1,4-diazabicyclo(2.2.2)octane (Dabco), 1,8-diazabicyclo(5.4.0)undec-7-ene, and alkanolamine compounds, such as triethanolamine, triisopropanolamine, N-methyldiethanolamine, N-ethyldiethanolamine, dimethylaminoethanol, 2-(N,N-dimethylaminoethoxy)ethanol, N,N',N''-tris(dialkylaminoalkyl)hexahydrotriazines, e.g., N,N',N''-tris(dimethylaminopropyl)-s-hexahydrotriazine, and triethylenediamine. Also suitable, however, are metal salts, such as iron(II) chloride, zinc chloride, lead octoate and preferably tin salts, such as tin dioctoate, tin diethylhexoate and dibutyltin dilaurate.

Useful catalysts D) further include amidines, such as 2,3-dimethyl-3,4,5,6-tetrahydropyrimidine, tetraalkylammonium hydroxides, such as tetramethylammonium hydroxide, alkali metal hydroxides, such as sodium hydroxide, and alkali metal alkoxides, such as sodium methoxide and potassium isopropoxide, and also alkali metal salts of acids, in particular long-chain fatty acids having 10 to 20 carbon atoms and optionally pendant OH groups.

It is preferred to use a mixture of two or more of the aforementioned catalysts D). It is particularly preferred to use a catalyst mixture D) consisting of: dimethylcyclohexylamine D1), pentamethyldiethylenetriamine or bis(2-dimethylaminoethyl) ether D2), tris(dimethylaminopropyl)hexahydro-1,3,5-triazine D3) and dimethylbenzylamine D4).

The proportions for the individual catalysts in the aforementioned catalyst mixture consisting of catalysts D1) to D4) are preferably from 20 to 60 wt % for catalyst D1), from 10 to 50 wt % for catalyst D2), from 10 to 40 wt % for catalyst D3) and from 20 to 50 wt % for catalyst D4), subject to the proviso that the sum total of catalysts D1) to D4) is 100 wt %.

It is preferable to use from 1.0 to 5.5 wt %, particularly from 1.0 to 5.0 wt %, of one or more catalysts D), based on the weight of components A) to F).

When a comparatively large excess of polyisocyanate is used during the foaming process, the following come into consideration for use as catalysts for the trimerization reaction between the excess NCO groups: catalysts that form isocyanurate groups, examples being ammonium ion or alkali metal salts alone or combined with tertiary amines. Isocyanate formation leads to flame-resistant PIR foams which are preferably used as industrial rigid foam, for example as sandwich elements or insulation board in civil engineering.

Further particulars regarding the catalysts referred to are found in the technical literature, for example Kunststoffhandbuch, volume VII, Polyurethanes, Carl Hanser Verlag Munich, Vienna, 1st, 2nd and 3rd editions 1966, 1983 and 1993.

Auxiliaries and/or Added Substances E)

The polyol component P) of the present invention may comprise auxiliaries and/or added substances E).

Useful auxiliaries and/or added substances E) for polyol component P) include, for example, surface-active substances such as emulsifiers, foam stabilizers and cell regulators, preferably foam stabilizers.

Useful surface-active substances include, for example, compounds that serve to augment the homogenization of the starting materials and are optionally also suitable for regulating the cell structure of the plastics. Suitable examples include emulsifiers, such as the sodium salts of castor oil sulfates or of fatty acids and also salts of fatty acids with amines, e.g., diethylamine oleate, diethanolamine stearate, diethanolamine ricinoleate, salts of sulfonic acids, e.g., alkali metal or ammonium salts of dodecylbenzene- or dinaphthylmethanedisulfonic acid and ricinoleic acid; foam stabilizers, such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators, such as paraffins, fatty alcohols and dimethylpolysiloxanes. Silicone stabilizers are particularly preferred.

Dipropylene glycol (DPG) is particularly preferable for use as addition agent.

Polyol component P) preferably comprises foam stabilizers, especially silicone-containing foam stabilizers such as siloxane-oxyalkylene copolymers and other organopolysiloxanes, as further auxiliary or as added substance E).

The aforementioned foam stabilizers are preferably employed in amounts of 0.5 to 4 wt %, more preferably 1 to 3 wt %, based on the weight of components A) to F).

Further particulars regarding the aforementioned and further suitable auxiliary and added-substance materials are found in the technical literature, for example the monograph by J. H. Saunders and K. C. Frisch "High Polymers" volume XVI, Polyurethanes, Parts 1 and 2, Interscience Publishers 1962 to 1964, respectively, or the Kunststoff-Handbuch, Polyurethanes, volume VII, Hanser-Verlag, Munich, Vienna, 1st and 2nd editions, 1966 and 1983.

Blowing Agents F)

Polyol component P) of the present invention may comprise at least a blowing agent F).

Polyol component P) of the present invention comprises with preference from 1 to 20.0 wt %, with particular preference from 1.5 to 5.0 wt % and with very particular preference from 1.0 to 3.0 wt % of blowing agent F), based on the entire polyol component P).

Both physical and chemical blowing agents are suitable.

Suitable blowing agents F) include in general any halogenated, preferably fluorinated, alkene blowing agents known to a person skilled in the art.

It is preferably $C_2$ to $C_6$ fluoroalkenes which are used according to the present invention, more preferably $C_3$ to $C_5$ fluoroalkenes.

Particularly preferred examples of florinated alkenes suitable for the purposes of the present invention include propenes, butenes, pentenes and hexenes having 3 to 6 fluoro substituents, while other substituents such as chloro may be present, examples being tetrafluoropropenes, chlorofluoropropenes, for example trifluoromonochloropropenes, pentafluoropropenes, chlorofluorobutenes, hexafluorobutenes or mixtures thereof.

Particularly preferred fluorinated alkenes for the purposes of the present invention are selected from the group consisting of cis- or trans-1,1,1,3-tetrafluoropropene, 1,1,1-trifluoro-2-chloropropene, 1-chloro-3,3,3-trifluoropropene, 1,1,1,2,3-pentafluoropropene, in cis- or trans-form, 1,1,1,4,4,4-hexafluorobutene, 1-bromopentafluoropropene, 2-bromopentafluoropropene, 3-bromopentafluoropropene, 1,1,2,3,3,4,4-heptafluoro-1-butene, 3,3,4,4,5,5,5-heptafluoro-1-pentene, 1-bromo-2,3,3,3-tetrafluoropropene, 2-bromo-1,3,3-tetrafluoropropen, 3-bromo-1,1,3,3-tetrafluoropropene, 2-bromo-3,3,3-trifluoropropene, E-1-bromo-3,3,3-trifluoropropene, 3,3,3-trifluoro-2-(trifluoromethyl)propene, 1-chloro-3,3,3-trifluoropropene, 2-chloro-3,3,3-trifluoropropene, 1,1,1-trifluoro-2-butene and mixtures thereof.

No halogenated hydrocarbons are preferably used as blowing agent F).

When a chemical blowing agent is used, it is preferably water. Water is preferably used at from 1.5 to 3 wt %, based on the entire polyol component P).

Preference for use as blowing agents is given to pentane isomers and/or cyclopentane, especially cyclopentane. Pentane isomers and/or cyclopentane are preferably used at from 9 to 17 wt %, based on the entire polyol component P). Cyclopentane is preferred.

Polyol component P) preferably comprises:
a) at least one polyether polyol A) having a functionality in the range from 5.7 to 6.4 and an OH number in the range from 300 to 500 mg KOH/g, comprising units based on the monomers selected from the group consisting of
   ai) sucrose,
   aii) monopropylene glycol, diethylene glycol, triethylene glycol, dipropylene glycol, glycerol or mixtures thereof,
   aiii) propylene oxide,
   or mixtures of ai), aii) and/or aiii),
b) at least one polyether polyol B) having a functionality in the range from 3.0 to 5.0 and an OH number in the range from 300 to 500 mg KOH/g, comprising units based on the monomers selected from the group consisting of
   bi) 2,3-, 3,4-, 2,4-, 2,5-, 2,6-tolylenediamine or mixtures thereof,
   bii) propylene oxide,
   or mixtures of bi) and bii),
c) at least one polyether polyol C) having a functionality in the range from 3.0 to 5.0 or 2.8 to 3.0 and an OH number in the range from 100 to 290 mg KOH/g, comprising units based on the monomers selected from the group consisting of
   ci) 2,3-, 3,4-, 2,4-, 2,5-, 2,6-tolylenediamine or mixtures thereof, monopropylene glycol, diethylene glycol, triethylene glycol, dipropylene glycol, glycerol or mixtures thereof,
   cii) ethylene oxide and/or propylene oxide,
   or mixtures of ci) and cii).

Polyol component P) preferably comprises:
a) at least one polyether polyol A) having a functionality in the range from 5.7 to 6.4 and an OH number in the range from 300 to 500 mg KOH/g, comprising units based on the monomers selected from the group consisting of
   ai) sucrose,
   aii) monopropylene glycol, diethylene glycol, triethylene glycol, dipropylene glycol, glycerol or mixtures thereof,
   aiii) propylene oxide,
   or mixtures of ai), aii) and/or aiii),
b) at least one polyether polyol B) having a functionality in the range from 3.0 to 5.0 and an OH number in the range from 300 to 500 mg KOH/g, comprising units based on the monomers selected from the group consisting of
   bi) 2,3-, 3,4-, 2,4-, 2,5-, 2,6-tolylenediamine or mixtures thereof,
   bii) propylene oxide,
   or mixtures of bi) and bii),
c) at least one polyether polyol C) having a functionality in the range from 3.0 to 5.0 or 2.8 to 3.0 and an OH number in the range from 100 to 290 mg KOH/g, comprising units based on the monomers selected from the group consisting of
- ci) 2,3-, 3,4-, 2,4-, 2,5-, 2,6-tolylenediamine or mixtures thereof, monopropylene glycol, diethylene glycol, triethylene glycol, dipropylene glycol, glycerol or mixtures thereof,
- cii) ethylene oxide and/or propylene oxide,
- or mixtures of ci) and cii).

d) at least one catalyst D),
e) at least one auxiliary and/or added substance E), and
f) optionally at least one blowing agent F).

Polyol component P) preferably comprises:
a) 1 to 70 wt %, preferably 40 to 65 wt %, of at least one polyether polyol A) having a functionality in the range from 5.7 to 6.4 and an OH number in the range from 300 to 500 mg KOH/g, comprising units based on the monomers selected from the group consisting of
- ai) sucrose,
- aii) monopropylene glycol, diethylene glycol, triethylene glycol, dipropylene glycol, glycerol or mixtures thereof,
- aiii) propylene oxide, or mixtures of ai), aii) and/or aiii), b) 1 to 50 wt %, preferably 10 to 40 wt %, of at least one polyether polyol B) having a functionality in the range from 3.0 to 5.0 and an OH number in the range from 300 to 500 mg KOH/g, comprising units based on the monomers selected from the group consisting of
- bi) 2,3-, 3,4-, 2,4-, 2,5-, 2,6-tolylenediamine or mixtures thereof,
- bii) propylene oxide,
- or mixtures of bi) and bii), c) 1 to 20 wt %, preferably 4 to 18 wt %, of at least one polyether polyol C) having a functionality in the range from 3.0 to 5.0 or 2.8 to 3.0 and an OH number in the range from 100 to 290 mg KOH/g, comprising units based on the monomers selected from the group consisting of
- ci) 2,3-, 3,4-, 2,4-, 2,5-, 2,6-tolylenediamine or mixtures thereof, or monopropylene glycol, diethylene glycol, triethylene glycol, dipropylene glycol, glycerol or mixtures thereof,
- cii) ethylene oxide and/or propylene oxide, or mixtures of ci) and cii), d) 0.1 to 10 wt %, preferably 1 to 5 wt %, of at least one catalyst D),
e) 0.1 to 10 wt %, preferably 1 to 5 wt %, of at least one auxiliary and/or added substance E), and
f) 0 to 10 wt %, preferably 1 to 5 wt %, of at least one blowing agent F),
wherein the sum total of components A), B), C), D), E) and optionally F) adds up to 100 wt %.

Polyol component P) preferably comprises:
a) 1 to 70 wt %, preferably 40 to 65 wt %, of at least one polyether polyol A) having a functionality in the range from 5.7 to 6.4 and an OH number in the range from 300 to 500 mg KOH/g, comprising units based on the monomers selected from the group consisting of
- ai) 10 to 29.9 wt % of sucrose,
- aii) 0.1 to 20 wt % of monopropylene glycol, diethylene glycol, triethylene glycol, dipropylene glycol, glycerol or mixtures thereof,
- aiii) 60 to 89.9 wt % of propylene oxide, or mixtures of ai), aii) and/or aiii), wherein the sum total of ai), aii) and aiii) adds up to 100 wt %, b) 1 to 50 wt %, preferably 10 to 40 wt %, of at least one polyether polyol B) having a functionality in the range from 3.0 to 5.0 and an OH number in the range from 300 to 500 mg KOH/g, comprising units based on the monomers selected from the group consisting of
- bi) 2,3-, 3,4-, 2,4-, 2,5-, 2,6-tolylenediamine or mixtures thereof,
- bii) propylene oxide, or mixtures of bi) and bii), wherein the sum total of bi) and bii) adds up to 100 wt %, c) 1 to 20 wt %, preferably 4 to 18 wt %, of at least one polyether polyol C) having a functionality in the range from 3.0 to 5.0 or 2.8 to 3.0 and an OH number in the range from 100 to 290 mg KOH/g, comprising units based on the monomers selected from the group consisting of
- ci) 2,3-, 3,4-, 2,4-, 2,5-, 2,6-tolylenediamine or mixtures thereof, monopropylene glycol, diethylene glycol, triethylene glycol, dipropylene glycol, glycerol or mixtures thereof,
- cii) ethylene oxide and/or propylene oxide, or mixtures of ci) and cii), wherein the sum total of ci) and cii) adds up to 100 wt %, d) 0.1 to 10 wt %, preferably 1 to 5 wt %, of at least one catalyst D),
e) 0.1 to 10 wt %, preferably 1 to 5 wt %, of at least one auxiliary and/or added substance E), and
f) 0 to 10 wt %, preferably 1 to 5 wt %, of at least one blowing agent F),
wherein the sum total of components A), B), C), D), E) and optionally F) adds up to 100 wt %.

Polyol component P) preferably comprises:
a) at least one polyether polyol A) having a functionality in the range from 5.7 to 6.1 and an OH number in the range from 300 to 500 mg KOH/g, comprising the units based on the monomers selected from the group consisting of
- ai) sucrose,
- aii) monopropylene glycol, diethylene glycol, triethylene glycol, dipropylene glycol, glycerol or mixtures thereof,
- aiii) propylene oxide,
- or mixtures of ai), aii) and/or aiii), b) at least one polyether polyol B) having a functionality in the range from 3.0 to 5.0 and an
OH number in the range from 300 to 500 mg KOH/g, comprising the units based on the monomers selected from the group consisting of
- bi) 2,3-, 3,4-, 2,4-, 2,5-, 2,6-tolylenediamine or mixtures thereof,
- bii) propylene oxide,
- or mixtures of bi) and bii), c) at least one polyether polyol C) having a functionality in the range from 3.0 to 5.0 or 2.8 to 3.0 and an OH number in the range from 100 to 290 mg KOH/g, comprising units based on the monomers selected from the group consisting of
- ci) 2,3-, 3,4-, 2,4-, 2,5-, 2,6-tolylenediamine or mixtures thereof, monopropylene glycol, diethylene glycol, triethylene glycol, dipropylene glycol, glycerol or mixtures thereof,
- cii) ethylene oxide and/or propylene oxide,
- or mixtures of ci) and cii).

Polyol component P) preferably comprises:
a) at least one polyether polyol A) having a functionality in the range from 5.7 to 6.1 and an OH number in the range from 300 to 500 mg KOH/g, comprising the units based on the monomers selected from the group consisting of
ai) sucrose,
aii) monopropylene glycol, diethylene glycol, triethylene glycol, dipropylene glycol, glycerol or mixtures thereof,
aiii) propylene oxide,
or mixtures of ai), aii) and/or aiii),
b) at least one polyether polyol B) having a functionality in the range from 3.0 to 5.0 and an OH number in the range from 300 to 500 mg KOH/g, comprising units based on the monomers selected from the group consisting of
bi) 2,3-, 3,4-, 2,4-, 2,5-, 2,6-tolylenediamine or mixtures thereof,
bii) propylene oxide,
or mixtures of bi) and bii),
c) at least one polyether polyol C) having a functionality in the range from 3.0 to 5.0 or 2.8 to 3.0 and an OH number in the range from 100 to 290 mg KOH/g, comprising units based on the monomers selected from the group consisting of
ci) 2,3-, 3,4-, 2,4-, 2,5-, 2,6-tolylenediamine or mixtures thereof, or monopropylene glycol, diethylene glycol, triethylene glycol, dipropylene glycol, glycerol or mixtures thereof,
cii) ethylene oxide and/or propylene oxide,
or mixtures of ci) and cii),
d) at least one catalyst D),
e) at least one auxiliary and/or added substance E), and
f) optionally at least one blowing agent F).
Polyol component P) preferably comprises:
a) at least one polyether polyol A) having a functionality in the range from 5.7 to 6.1 and an OH number in the range from 300 to 500 mg KOH/g, consisting of the units based on the monomers selected from the group consisting of
ai) sucrose,
aii) monopropylene glycol, diethylene glycol, triethylene glycol, dipropylene glycol, glycerol or mixtures thereof,
aiii) propylene oxide,
or mixtures of ai), aii) and/or aiii),
b) at least one polyether polyol B) having a functionality in the range from 3.0 to 5.0 and an OH number in the range from 300 to 500 mg KOH/g, consisting of the units based on the monomers selected from the group consisting of
bi) 2,3-, 3,4-, 2,4-, 2,5-, 2,6-tolylenediamine or mixtures thereof,
bii) propylene oxide,
or mixtures of bi) and bii),
c) at least one polyether polyol C) having a functionality in the range from 3.0 to 5.0 or 2.8 to 3.0 and an OH number in the range from 100 to 290 mg KOH/g, comprising units based on the monomers selected from the group consisting of
ci) 2,3-, 3,4-, 2,4-, 2,5-, 2,6-tolylenediamine or mixtures thereof, monopropylene glycol, diethylene glycol, triethylene glycol, dipropylene glycol, glycerol or mixtures thereof,
cii) ethylene oxide and/or propylene oxide,
or mixtures of ci) and cii).
Polyol component P) preferably comprises:
a) at least one polyether polyol A) having a functionality in the range from 5.7 to 6.1 and an OH number in the range from 300 to 500 mg KOH/g, consisting of the units based on the monomers selected from the group consisting of
ai) sucrose,
aii) monopropylene glycol, diethylene glycol, triethylene glycol, dipropylene glycol, glycerol or mixtures thereof,
aiii) propylene oxide,
or mixtures of ai), aii) and/or aiii),
b) at least one polyether polyol B) having a functionality in the range from 3.0 to 5.0 and an OH number in the range from 300 to 500 mg KOH/g, comprising units based on the monomers selected from the group consisting of
bi) 2,3-, 3,4-, 2,4-, 2,5-, 2,6-tolylenediamine or mixtures thereof,
bii) propylene oxide,
or mixtures of bi) and bii),
c) at least one polyether polyol C) having a functionality in the range from 3.0 to 5.0 or 2.8 to 3.0 and an OH number in the range from 100 to 290 mg KOH/g, comprising units based on the monomers selected from the group consisting of
ci) 2,3-, 3,4-, 2,4-, 2,5-, 2,6-tolylenediamine or mixtures thereof, monopropylene glycol, diethylene glycol, triethylene glycol, dipropylene glycol, glycerol or mixtures thereof,
cii) ethylene oxide and/or propylene oxide, or mixtures of ci) and cii),
d) at least one catalyst D),
e) at least one auxiliary and/or added substance E), and
f) optionally at least one blowing agent F).
Polyol component P) preferably consists of:
a) at least one polyether polyol A) having a functionality in the range from 5.7 to 6.1 and an OH number in the range from 300 to 500 mg KOH/g, consisting of the units based on the monomers selected from the group consisting of
ai) sucrose,
aii) monopropylene glycol, diethylene glycol, triethylene glycol, dipropylene glycol, glycerol or mixtures thereof,
aiii) propylene oxide,
or mixtures of ai), aii) and/or aiii),
b) at least one polyether polyol B) having a functionality in the range from 3.0 to 5.0 and an OH number in the range from 300 to 500 mg KOH/g, comprising units based on the monomers selected from the group consisting of
bi) 2,3-, 3,4-, 2,4-, 2,5-, 2,6-tolylenediamine or mixtures thereof,
bii) propylene oxide,
or mixtures of bi) and bii),
c) at least one polyether polyol C) having a functionality in the range from 3.0 to 5.0 or 2.8 to 3.0 and an OH number in the range from 100 to 290 mg KOH/g, comprising units based on the monomers selected from the group consisting of
ci) 2,3-, 3,4-, 2,4-, 2,5-, 2,6-tolylenediamine or mixtures thereof, monopropylene glycol, diethylene glycol, triethylene glycol, dipropylene glycol, glycerol or mixtures thereof,
cii) ethylene oxide and/or propylene oxide,
or mixtures of ci) and cii).
Polyol component P) preferably consists of:
a) at least one polyether polyol A) having a functionality in the range from 5.7 to 6.1 and an OH number in the range from 300 to 500 mg KOH/g, consisting of the units based on the monomers selected from the group consisting of
  ai) sucrose,
  aii) monopropylene glycol, diethylene glycol, triethylene glycol, dipropylene glycol, glycerol or mixtures thereof,
  aiii) propylene oxide,
  or mixtures of ai), aii) and/or aiii),
b) at least one polyether polyol B) having a functionality in the range from 3.0 to 5.0 and an OH number in the range from 300 to 500 mg KOH/g, comprising units based on the monomers selected from the group consisting of bi) 2,3-, 3,4-, 2,4-, 2,5-, 2,6-tolylenediamine or mixtures thereof,
  bii) propylene oxide,
  or mixtures of bi) and bii),
c) at least one polyether polyol C) having a functionality in the range from 3.0 to 5.0 or 2.8 to 3.0 and an OH number in the range from 100 to 290 mg KOH/g, comprising units based on the monomers selected from the group consisting of
  ci) 2,3-, 3,4-, 2,4-, 2,5-, 2,6-tolylenediamine or mixtures thereof, monopropylene glycol, diethylene glycol, triethylene glycol, dipropylene glycol, glycerol or mixtures thereof,
  cii) ethylene oxide and/or propylene oxide,
  or mixtures of ci) and cii),
d) at least one catalyst D),
e) at least one auxiliary and/or added substance E), and
f) optionally at least one blowing agent F), preferably one blowing agent.

Polyol component P) preferably comprises:
a) 1 to 70 wt %, preferably 40 to 65 wt %, of at least one polyether polyol A) having a functionality in the range from 5.7 to 6.4, especially 5.95 to 6.05, and an OH number in the range from 300 to 500 mg KOH/g, consisting of the units based on the monomers selected from the group consisting of
  ai) 10 to 29.9 wt % of sucrose,
  aii) 0.1 to 20 wt % of monopropylene glycol, diethylene glycol, triethylene glycol, dipropylene glycol, glycerol or mixtures thereof,
aiii) 60 to 89.9 wt % of propylene oxide,
  or mixtures of ai), aii) and/or aiii), wherein the sum total of ai), aii) and aiii) adds up to 100 wt %,
b) 1 to 50 wt %, preferably 10 to 40 wt %, of at least one polyether polyol B) having a functionality in the range from 3.0 to 5.0 and an OH number in the range from 300 to 500 mg KOH/g, consisting of the units based on the monomers selected from the group consisting of
  bi) 2,3-, 3,4-, 2,4-, 2,5-, 2,6-tolylenediamine or mixtures thereof,
  bii) propylene oxide,
  or mixtures of bi) and bii), wherein the sum total of bi) and bii) adds up to 100 wt %,
c) 1 to 20 wt %, preferably 4 to 18 wt %, of at least one polyether polyol C) having a functionality in the range from 3.0 to 5.0 and an OH number in the range from 1 to 290 mg KOH/g, consisting of the units based on the monomers selected from the group consisting of
  ci) 2,3-, 3,4-, 2,4-, 2,5-, 2,6-tolylenediamine or mixtures thereof, monopropylene glycol, diethylene glycol, triethylene glycol, dipropylene glycol, glycerol or mixtures thereof,
  cii) ethylene oxide and/or propylene oxide,
  or mixtures of ci) and cii), wherein the sum total of ci) and cii) adds up to 100 wt %,
d) 0.1 to 10 wt %, preferably 1 to 5 wt %, of at least one catalyst D),
e) 0.1 to 10 wt %, preferably 1 to 5 wt %, of at least one auxiliary and/or added substance E), and
f) 0 to 20 wt %, preferably 1.5 to 5 wt %, of at least one blowing agent F), wherein the sum total of components A), B), C), D), E) and optionally F) adds up to 100 wt %.

Polyol component P) preferably consists of:
a) 1 to 70 wt %, preferably 40 to 65 wt %, of at least one polyether polyol A) having a functionality in the range from 5.7 to 6.4, especially 5.9 to 6.1, and an OH number in the range from 300 to 500 mg KOH/g, consisting of the units based on the monomers selected from the group consisting of
  ai) 10 to 29.9 wt % of sucrose,
  aii) 0.1 to 20 wt % of monopropylene glycol, diethylene glycol, triethylene glycol, dipropylene glycol, glycerol or mixtures thereof,
  aiii) 60 to 89.9 wt % of propylene oxide, or mixtures of ai), aii) and/or aiii), wherein the sum total of ai), aii) and aiii) adds up to 100 wt %,
b) 1 to 50 wt %, preferably 10 to 40 wt %, of at least one polyether polyol B) having a functionality in the range from 3.0 to 5.0 and an OH number in the range from 300 to 500 mg KOH/g, consisting of the units based on the monomers selected from the group consisting of
  bi) 2,3-, 3,4-, 2,4-, 2,5-, 2,6-tolylenediamine or mixtures thereof,
  bii) propylene oxide, or mixtures of bi) and bii), wherein the sum total of bi) and bii) adds up to 100 wt %,
c) 1 to 20 wt %, preferably 4 to 18 wt %, of at least one polyether polyol C) having a functionality in the range from 3.0 to 5.0 and an OH number in the range from 1 to 290 mg KOH/g, consisting of the units based on the monomers selected from the group consisting of
  ci) 2,3-, 3,4-, 2,4-, 2,5-, 2,6-tolylenediamine or mixtures thereof, monopropylene glycol, diethylene glycol, triethylene glycol, dipropylene glycol, glycerol or mixtures thereof,
  cii) ethylene oxide and/or propylene oxide,
  or mixtures of ci) and cii), wherein the sum total of ci) and cii) adds up to 100 wt %,
d) 0.1 to 10 wt %, preferably 1 to 5 wt %, of at least one catalyst D),
e) 0.1 to 10 wt %, preferably 1 to 5 wt %, of at least one auxiliary and/or added substance E), and
f) 0 to 20 wt %, preferably 1.5 to 5 wt %, of at least one blowing agent F),
wherein the sum total of components A), B), C), D), E) and optionally F) adds up to 100 wt %.

The invention likewise provides a process for preparing rigid polyurethane foams by reaction of:
I) organic or modified organic di- or polyisocyanates PI) or mixtures thereof with
II) an invention polyol component P) whereto a blowing agent F) was added.

Di- or polyisocyanates PI)

Compounds useful as organic di- or polyisocyanates PI) include the familiar aliphatic, cycloaliphatic, araliphatic and preferably the aromatic polyfunctional isocyanates. Said organic di- or polyisocyanates may optionally be in a modified state.

Specific examples include alkylene diisocyanates having 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3-diisocyanate and cyclohexane 1,4-diisocyanate and also any desired mixtures thereof, 1-isocyanato-3,3,5-trimethyl-5-isocyanatomethylcyclohexane (IPDI), 2,4- and 2,6-hexahydrotolylene diisocyanate and also the corresponding isomeric mixtures, 4,4'-, 2,2'- and 2,4'-dicyclohexylmethane diisocyanate and also the corresponding isomeric mixtures, and preferably aromatic di- and polyisocyanates, for example 2,4- and 2,6-tolylene diisocyanates and the corresponding isomeric mixtures, 4,4'-, 2,4'- and 2,2'-diphenylmethane diisocyanate and the corresponding isomeric mixtures, mixtures of 4,4'- and 2,2'-diphenylmethane diisocyanates, polyphenyl polymethylene polyisocyanates, mixtures of 2,4'-, 2,4'- and 2,2'-diphenylmethane diisocyanates and polyphenyl polymethylene polyisocyanates (crude MDI) and mixtures of crude MDI and tolylene diisocyanates. Organic di- or polyisocyanates are employable singly or in the form of their mixtures.

Preferred polyisocyanates are tolylene diisocyanate (TDI), diphenylmethane diisocyanate (MDI) and especially mixtures of diphenylmethane diisocyanate and polyphenylene polymethylene polyisocyanates (polymer MDI or PMDI).

Modified polyvalent isocyanates, i.e., products obtained by converting organic polyisocyanates chemically, are frequently also used. Examples are polyisocyanates comprising ester, urea, biuret, allophanate, carbodiimide, isocyanurate, uretdione, carbamate and/or urethane groups.

A very particularly preferred way to prepare the rigid polyurethane foams of the present invention involves using polymer MDI, e.g., Lupranat® M20 from BASF SE.

To prepare the rigid polyurethane foams of the present invention, the optionally modified organic di- and/or polyisocyanates PI) and polyol component P) of the present invention are reacted with the additionally added physical blowing agent F) in such amounts that the isocyanate index is from 70 to 300, preferably from 90 to 200, more preferably from 100 to 150.

The rigid polyurethane foams are advantageously obtained via the one shot process, for example using high pressure or low pressure technology in open or closed molds, for example metallic molds. Another customary way is to apply the reaction mixture in a continuous manner to suitable belt lines to produce panels.

The starting components are mixed at a temperature of from 10 to 30° C., preferably from 15 to 30° C. and especially from 15 to 25° C. and the mixture is introduced into an open mold or, optionally under elevated pressure, into a closed mold. Mixing is typically carried out in a high pressure mixing head. Mold temperature is advantageously from 30 to 70° C., preferably from 40 to 60° C.

The invention further provides a rigid polyurethane foam obtainable by the process of the invention.

The invention further provides the method of using the polyol component P) of the invention in the production of rigid polyurethane foams.

The invention further provides the method of using the rigid polyurethane foams obtained by the process of the invention for insulation and refrigeration applications, especially in refrigerators, commercial refrigeration equipment, freezer chests, hot water storage systems and boilers.

The above-itemized embodiments and preferred embodiments are all preferably freely combinable with each or one another unless the context unambiguously says otherwise.

The expressions "comprising" and "comprises" preferably also comprehend the expressions "consisting", "consisting of" or "consists of".

The examples which follow provide further elucidation of the invention.

EXAMPLES

Methods of Measurement:
Measurement of Hydroxyl Number:
Hydroxyl numbers were determined according to DIN 53240 (1971-12).
Viscosity Determination:
Unless otherwise stated, polyol viscosity was determined at 25° C. in accordance with DIN EN ISO 3219 (1994) using a Haaker Viscotester 550 with plate/cone measurement geometry (PK100) using the cone PK 1 1° (diameter: 28 mm; cone angle: 1°) at a shear rate of 40 1/s.
Determination of Pentane Solubility:
Good pentane solubility of the polyol component over a large temperature range, starting at a temperature as low as possible (>5° C.), is of great importance in the processing industry: it allows an assurance to be given of effective shelf life of the polyol component under different climatic conditions. To evaluate its pentane solubility (as the stability of the polyol component PC with blowing agent), polyol component P) is mixed (Vollrath stirrer, 1500 rpm, 2 min stirring time) with the amount which was reported in the examples for physical blowing agent F), and the mixture is poured into a screw-top jar which is then closed. Following complete escapage of gas bubbles, sample clarity is initially assessed at room temperature. If the sample is clear, it is subsequently cooled down in a water bath in increments of 1° C. and assessed for clarity 30 min after reaching the temperature setting.
Determination of Demolding Behavior:
A good demolding behavior is of the utmost interest in the processing industry, since processing times reduce as a result, based on the foam employed. This increases the productivity and allows the costs to be consequently reduced. Good demolding behavior is determined by the postexpansion of the cured rigid PU foam. Within the extremely short cure time of the components employed, minimal postexpansion within the mold is desirable, since it enables more rapid demolding. Demolding behavior is determined by measuring the postexpansion of foam bodies produced using a 700×400×90 mm box mold at a mold temperature of 45±2° C. as a function of demolding time and the degree of overpacking (OP, which corresponds to the ratio of overall apparent density/minimum fill density and describes the percentage extra amount of starting materials actually required for introduction in order just to fill the mold with a rigid PU foam). Postexpansion is determined by measuring the foam cuboids after 24 h.
Minimum Fill Density for a Component Part/Free Rise Density:
Minimum fill density is determined by importing just sufficient polyurethane reaction mixture into a mold measuring 2000×200×50 mm at a mold temperature of 45±2° C. to just fill the mold without touching the end of the mold. The length of the flow path was measured and the minimum fill density was calculated according to $MFD=(m*L/(V*s))$, wherein m=mass, L=length of the mold, s=flow path and V=volume of the mold. Free rise density is determined by allowing the foaming polyurethane reaction mixture to expand in a plastic bag at room temperature. The density is determined on a cube removed from the center of the foam-filled plastic bag.

Determination of Flowability:

The flowability is reported in terms of the flow factor=(minimum fill density/free rise density).

Thermal Conductivity:

Thermal conductivity was determined using a Taurus TCA300 DTX at a midpoint temperature of 10° C. To prepare the test specimens, the polyurethane reaction mixture was imported into a 2000×200×50 mm mold with 15% overpacking and demolded 5 min later. After aging for 24 hours under standard conditions, several foam cuboids (at positions 10, 900 and 1700 mm on the lower end of the Brett molding) measuring 200×200×50 mm are cut out of the center. The top and bottom sides were then removed to obtain test specimens measuring 200×200×30 mm.

Compressive Strength:

Compressive strength was determined according to DIN ISO 844 EN DE (2014-11).

Preparation of Polyether Polyols A)

Polyether polyol A (in accordance with the present invention)

Starting Materials:

Especially with the use of solid starter compounds, for example sucrose, but slow rates of metering are possible at the start of the process, since the alkylene oxide is but slow to dissolve in the reaction mixture and leads to slow rates of reaction. In addition, the high viscosity created by use of solid starter compounds in the starter mixture is responsible for a worse dissipation of heat. This can lead to local overheating, which has an adverse effect on product quality. The high viscosity moreover accelerates the wear of pumps and heat exchangers. Admixing a polyol to the starter mixture is a way to reduce the adverse effects. This is described in EP 2542612 for example. In some of the tests described, therefore, the mixtures of the starter compounds were admixed with polyetherols in order to reduce the viscosity of the starting mixture and provide better process control. Two polyetherols are preferably used: polyol H is an imidazole sucrose/glycerol-started catalyzed propoxylate having a molar mass of 488 g/mol and a functionality of 4.3; polyol I is catalyzed sucrose/glycerol-started with a molecular weight of 639 g/mol and a functionality of 5.1.

With the use of tolylenediamine (TDA), all the isomers are usable alone or in any desired mixtures with each or one another. Especially 2,4-TDA, 2,6-TDA, mixtures of 2,4-TDA and 2,6-TDA, 2,3-TDA, 3,4-TDA, mixtures of 3,4-TDA and 2,3-TDA and also mixtures of all the isomers referred to are employable. 2,3-TDA and 3,4-TDA are often also referred to as ortho-TDA or as vicinal TDA. The TDA may be exclusively vicinal TDA. In one particularly preferred embodiment of the process according to the present invention, the TDA is >85%, preferably >90%, more preferably >95% and especially not less than 99 wt %, all based on the weight of TDA, vicinal TDA.

Polyetherol I Composition in weight percent:
sucrose 25%, glycerol 7.6%, propylene oxide 67.4%
Polyetherol H Composition in weight percent:
sucrose 20.3%, glycerol 13.3%, propylene oxide 66.4%
Preparation of Polyether Polyols A)
Polyether Polyol A (in Accordance with the Present Invention):

A 900 l pressure reactor equipped with stirrer, jacket heating and cooling, metering devices for solid and liquid substances and alkylene oxides and also devices for nitrogen inertization and a vacuum system was filled with 12.3 kg of glycerol, 90.70 kg of sucrose, 0.34 kg of solid imidazole and 29.00 kg of polyol H. Then, the reactor was repeatedly inertized (under agitation) and the temperature was raised to 120° C. The mixture was reacted with 256.3 kg of propylene oxide at 120° C. The postreaction of 2 hours took place at 120° C. The sample was subsequently stripped off in a nitrogen stream to obtain 372 kg of product having the following parameters:

| | |
|---|---|
| OH number | 429 mg KOH/g |
| Viscosity (25° C.) | 34 600 mPas |

Computation of Starter Functionality:
Glycerol (functionality 3): 12 300 g/92.09 g/mol=132.4 mol
Sucrose (functionality 8): 90 700 g/342.3 g/mol=246.97 mol
Imidazole (functionality 1): 340 g/68.08 g/mol=5.0 mol
Polyol H (functionality 4.3): 29 000 g/488 g/mol=59.4 mol
Starter functionality: (132.4 mol*3+246.97 mol*8+5.0 mol*1+59.4 mol*4.3)/(132.4 mol+246.97 mol+5.0 mol+59.40 mol)=6.0

Composition (Mass Percent):

| | |
|---|---|
| Sucrose | 23.3% |
| Glycerol | 3.2% |
| Polyol H | 7.5% |
| Propylene oxide | 66.0% |

Polyether Polyol A1 (in Accordance with the Present Invention):

The reactor described under polyether polyol A was filled with 6.31 kg of glycerol, 5.91 kg of dipropylene glycol, 34.6 kg of polyol H and 104.0 kg of sucrose and 0.340 kg of solid imidazole and repeatedly inertized. The mixture was reacted with 248.5 kg of propylene oxide at 120° C. The postreaction of 3 hours took place at 120° C. The sample was subsequently stripped off in a nitrogen stream to obtain 369 kg of product having the following parameters:

| | |
|---|---|
| OH number | 442 mg KOH/g |
| Viscosity | 40 900 mPas |

Computation of Functionality:
Glycerol (functionality 3): 6310 g/92.09 g/mol=67.9 mol
Sucrose (functionality 8): 104 000 g/342.3 g/mol=303.8 mol
Imidazole (functionality 1): 340 g/68.08 g/mol=5.0 mol
Polyol H (functionality 4.3): 34 600 g/488 g/mol=70.9 mol
Dipropylene glycol (functionality 2): 5910 g/134.2 g/mol=44.1 mol
Functionality: (67.9 mol*3+303.8 mol*8+5.0 mol*1+70.9 mol*4.3+44.1 mol*2)/(67.9 mol+303.8 mol+5.0 mol+70.9 mol+44.1 mol)=6.17

Composition (Mass Percent):

| | |
|---|---|
| Sucrose | 26.0% |
| Glycerol | 1.6% |
| Polyol H | 8.7% |

| Dipropylene glycol | 1.5% |
| Propylene oxide | 62.2% |

Polyether Polyol A2 (in Accordance with the Present Invention):

The reactor described under polyether polyol A was filled with 10.50 kg of glycerol, 32.09 kg of polyol I and 100.26 kg of sucrose and 0.503 kg of solid imidazole and repeatedly inertized. The mixture was reacted with 259.31 kg of propylene oxide at 120° C. The postreaction of 3 hours took place at 120° C. The sample was subsequently stripped off in a nitrogen stream to obtain 379 kg of product having the following parameters:

| OH number | 413 mg KOH/g |
| Viscosity | 28 800 mPas |

Computation of Functionality:
Glycerol (functionality 3): 10 500 g/92.09 g/mol=113.0 mol
Sucrose (functionality 8): 100 260 g/342.3 g/mol=292.9 mol
Imidazole (functionality 1): 503 g/68.08 g/mol=7.4 mol
Polyol I (functionality 5.1): 32 090 g/639 g/mol=50.2 mol
Functionality: (113.0 mol*3+292.9 mol*8+7.4 mol*1+50.2 mol*5.1)/(113.0 mol+292.9 mol+7.4 mol+50.2 mol)=6.36
Composition (Mass Percent):

| Sucrose | 24.9% |
| Polyol I | 8.0% |
| Glycerol | 2.6% |
| Propylene oxide | 64.5% |

Polyether Polyol AV1 (not in Accordance with the Present Invention):

The reactor described under polyether polyol A was filled with 58.2 kg of glycerol, 6.0 kg of dimethylethanolamine, 191.6 kg of sucrose and repeatedly inertized. The mixture was reacted with 195.0 kg of propylene oxide at 100° C. The temperature was then raised to 120° C. and the product was reacted with a further 352.7 kg of propylene oxide. The postreaction of 3 hours took place at 120° C. The propylene oxide still present was subsequently stripped off in a nitrogen stream to obtain 770 kg of product having the following parameters:

| OH number | 455 mg KOH/g |
| Viscosity | 14 861 mPas |

Computation of Functionality:
Sucrose (functionality 8): 191 600 g/342.3 g/mol=559.74 mol
Dimethylethanolamine (functionality 1): 6000 g/89.14 g/mol=67.31 mol
Functionality: (626.48 mol*3+559.74 mon+67.31 mol*1)/(626.48 mol+559.74 mol+67.31 mol)=5.12

Polyether Polyol AV2 (not in Accordance with the Present Invention):

The reactor described under polyether polyol A was filled with 8.60 kg of glycerol, 17.25 kg of polyol H, 113.15 kg of sucrose and 0.434 kg of pure imidazole and repeatedly inertized. The mixture was reacted with 261.43 kg of propylene oxide at 120° C. The postreaction of 3 hours took place at 120° C. The sample was subsequently stripped off in a nitrogen stream to obtain 372 kg of product having the following parameters:

| OH number | 457 mg KOH/g |
| Viscosity | 106 000 mPas |

Computation of Functionality:
Glycerol (functionality 3): 8600 g/92.09 g/mol=92.6 mol
Sucrose (functionality 8): 113 150 g/342.3 g/mol=330.6 mol
Imidazole (functionality 1): 434 g/68.08 g/mol=6.4 mol
Polyol H (functionality 4.3): 17 250 g/488 g/mol=35.3 mol
Functionality: (92.6 mol*3+330.6 mol*8+6.4 mol*1+35.3 mol*4.3)/(92.6 mol+330.6 mol+6.4 mol+35.3 mol)=6.63

Polyether Polyol AV3 (not in Accordance with the Present Invention):

The reactor described under polyether polyol A was filled with 4.933 kg of glycerol, 11.633 kg of polyol H and 118.5 kg of sucrose and 0.433 kg of solid imidazole and repeatedly inertized. The mixture was reacted with 264.05 kg of propylene oxide at 120° C. The postreaction of 3 hours took place at 120° C. The sample was subsequently stripped off in a nitrogen stream to obtain 375 kg of product having the following parameters:

| OH number | 455 mg KOH/g |
| Viscosity | 115 000 mPas |

Computation of Functionality:
Glycerol (functionality 3): 4933 g/92.09 g/mol=53.10 mol
Sucrose (functionality 8): 118 500 g/342.3 g/mol=346.19 mol
Polyol H (functionality 4.3): 11 633 g/488 g/mol=23.84 mol
Functionality: (53.10 mol*3+346.19 mol*8+6.4 mol*1+23.84 mol*4.3)/(53.10 mol+346.19 mol+6.4 mol+23.84 mol)=7.07

Preparation of Polyether Polyols B) and C)

Polyether Polyol B:

A 900 l pressure reactor equipped with stirrer, jacket heating and cooling, metering devices for solid and liquid substances and alkylene oxides and also devices for nitrogen inertization and a vacuum system was heated up to 80° C. and repeatedly inertized. 120.2 kg of vicinal tolylenediamine were introduced into the reactor and the stirrer was switched on. Then, the reactor was inertized once more and the temperature was raised to 130° C. and 160.06 kg of propylene oxide were metered in. Following a reaction of 2 h, the temperature was lowered to 100° C. and 4.29 kg of dimethylethanolamine were added. The intermediate product was reacted with a further 233.97 kg of propylene oxide. The postreaction ran for 2 hours at 130° C. to obtain 508.6 kg of product having the following parameters:

| OH number | 399 mg KOH/g |
| Viscosity | 17 016 mPas |

Polyether Polyol BV1

A 600 l pressure reactor equipped with stirrer, jacket heating and cooling, metering devices for solid and liquid substances and alkylene oxides and also devices for nitrogen inertization and a vacuum system was heated up to 80° C. and repeatedly inertized. 112.4 kg of vicinal tolylenediamine were introduced into the reactor and the stirrer was switched on. Then, the reactor was inertized once more and the temperature was raised to 130° C. and a mixture of 65.0 kg of propylene oxide and 74.1 kg of ethylene oxide was metered in. Following a reaction of 1.5 h, the temperature was lowered to 100° C. and 3.7 kg of dimethylethanolamine were added. The intermediate product was reacted with a further 262.7 kg of propylene oxide. The postreaction ran for 2.5 hours at 100° C. to obtain 506.1 kg of product having the following parameters:

| OH number | 405 mg KOH/g |
|---|---|
| Viscosity | 11 940 mPas |

Polyether Polyol C:

The reactor described under polyether polyol A was charged with 32.24 kg of vicinal tolylenediamine and repeatedly inertized. The temperature was raised to 130° C. and the mixture was at that temperature admixed with 32.36 kg of a mixture of ethylene oxide and propylene oxide (1.97 kg of EO, 30.39 kg of PO). Following a reaction of 2 h, 0.652 kg of 50% aqueous KOH solution (mass percent) was admixed. This was followed by a vacuum phase of 1 h and the subsequent metered addition at 130° C. of 344.75 kg of a mixture of ethylene oxide and propylene oxide (20.99 kg of ethylene oxide, 323.76 kg of propylene oxide). Following a reaction of 3 h, the sample was stripped off in a nitrogen stream to obtain 380 kg of a product having the following parameters:

| OH number | 160 mg KOH/g |
|---|---|
| Viscosity | 650 mPas |

Polyether Polyol C1:

The reactor described under polyether polyol A was filled with 36.80 kg of glycerol and 3925 g of 50% aqueous KOH solution (mass percent). The temperature was then raised to 130° C. and a starter drying at 10 mbar was carried out for 2 h. This was followed by the metered addition of 361.90 kg of propylene oxide at 130° C. Following a reaction of 3 h, the sample was stripped off in a nitrogen stream to obtain 378 kg of a product having the following parameters:

| OH number | 172 mg KOH/g |
|---|---|
| Viscosity | 270 mPas |

Catalyst Mixture D):
Catalyst mixture D) consisting of:
Catalyst D1): dimethylcyclohexylamine
Catalyst D2): pentamethyldiethylenetriamine or bis(2-dimethylaminoethyl) ether
Catalyst D3): tris(dimethylaminopropyl)hexahydro-1,3,5-triazine
Catalyst D4): dimethylbenzylamine
Stabilizer E):
Silicone-containing foam stabilizer, Tegostab® B8474 and/or Tegostab® B8491 from Evonik
Isocyanate:
Polymer MDI having an NCO content of 31.5 wt % (Lupranat® M20)

The aforementioned raw materials were used to prepare a polyol component (all particulars in wt %) which was mixed with a physical blowing agent before foaming. A PU 30/80 IQ high pressure Puromat® (Elastogran GmbH) operating at an output rate of 250 g/s was used to mix the polyol component, which had been admixed with the physical blowing agent, with the requisite amount of the reported isocyanate to obtain an isocyanate index (unless otherwise stated) of 119.

The reaction mixture was injected into molds temperature regulated to 40° C. and measuring 2000 mm×200 mm×50 mm and/or 400 mm×700 mm×90 mm and allowed to foam up therein. Overpacking was 17.5%, i.e., 17.5% more reaction mixture than needed to completely foam out the mold was used.

Table 1 shows the measured results for the particular composition of the polyol component P) (=PC; particulars in wt %) and the foams resulting therefrom. The amount of physical blowing agent (cyclopentane) is reported in parts by weight added to 100 parts by weight of the polyol component.

Polyol in accordance with the present invention thus provides better (i.e., smaller) postexpansion and better compressive strength. Polyols AV2, AV3 and BV1 cannot be used because the pentane compatibility is >20° C. and the viscosities are >>11 000 mPas. Adequate industrial processing, however, requires good pentane compatibilities at 10° C. at least, and max. 11 000 mPas at 20° C. is considered to be the technical limit for cabinet formulations. Example 3 and Comparative Example 4 demonstrate formulations specifically for cavity foam filling of doors. Comparative Example 5 shows the use of a polyol BV1 which is prepared starting from vicinal tolylenediamine and which contains both ethylene oxide and propylene oxide units. Finally, it is clear from table 1 that the polyol which is in accordance with the invention (polyol component P) delivers better postexpansion (that is, reduced postexpansion of the cured rigid PU foams after 24 h) and leads to better compressive strengths. It is also evident from Comparative Example 5, moreover, that the use of a defined functionality range of polyol A in combination with polyol B results in the desired properties. If, in fact, polyol A is combined with an analogous polyol, polyol BV1, which contains both ethylene oxide and propylene oxide units, then it is not possible to achieve improved demolding behavior.

TABLE 1

|  | Ex. 1 | Ex. 2 | Comp. Ex. 1 | Comp. Ex. 2 | Comp. Ex. 3 | Ex. 3 | Comp. Ex. 4 | Comp. Ex. 5 |
|---|---|---|---|---|---|---|---|---|
| polyol A | 56 | 0 | 0 | 0 | 0 | 0 | 0 | 56 |
| polyol A1 | 0 | 56 | 0 | 0 | 0 | 0 | 0 | 0 |
| polyol A2 | 0 | 0 | 0 | 0 | 0 | 40.9 | 0 | 0 |
| polyol AV1 | 0 | 0 | 56 | 0 | 0 | 0 | 40.9 | 0 |

TABLE 1-continued

|  | Ex. 1 | Ex. 2 | Comp. Ex. 1 | Comp. Ex. 2 | Comp. Ex. 3 | Ex. 3 | Comp. Ex. 4 | Comp. Ex. 5 |
|---|---|---|---|---|---|---|---|---|
| polyol AV2 | 0 | 0 | 0 | 56 | 0 | 0 | 0 | 0 |
| polyol AV3 | 0 | 0 | 0 | 0 | 56 | 0 | 0 | 0 |
| polyol B | 24 | 24 | 24 | 24 | 24 | 47.5 | 47.5 | 0 |
| polyol BV1 | 0 | 0 | 0 | 0 | 0 | 0 | 0 | 24 |
| polyol C | 12 | 12 | 12 | 12 | 12 | 0 | 0 | 12 |
| polyol C1 | 0 | 0 | 0 | 0 | 0 | 4.7 | 4.7 | 0 |
| DPG | 0.9 | 0.9 | 0.9 | 0.9 | 0.9 | 0 | 0 | 0.9 |
| stabilizer | 2.5 | 2.5 | 2.5 | 2.5 | 2.5 | 2.8 | 2.8 | 2.5 |
| $H_2O$ | 2.5 | 2.5 | 2.5 | 2.5 | 2.5 | 2.0 | 2.0 | 2.5 |
| catalyst mixture | 2.1 | 2.1 | 2.1 | 2.1 | 2.1 | 2.1 | 2.1 | 2.1 |
| sum total | 100 | 100 | 100 | 100 | 100 | 100 | 100 | 100 |
| cyclopentane 95 | 13.5 | 13.5 | 13.5 | 13.5 | 13.5 | 15.8 | 15.8 | 13.5 |
| NCO index | 119 | 119 | 119 | 119 | 119 | 117 | 117 | 119 |
| Laboratory data | | | | | | | | |
| fiber time [s] | 57 | 57 | 58 | 56 | 56 | 54 | 54 | 58 |
| free rise density [g/L] | 27.5 | 27.3 | 27.1 | 26.8 | 26.9 | 28.5 | 28.6 | 27.0 |
| PC stability with cyclopentane [° C.] | <5 | <5 | <5 | >20 | >20 | <5 | <5 | >20 |
| viscosity at 20° C. [mPas] | 10 500 | 9900 | 8700 | 15 000 | 16 700 | 16 700 | 15 200 | 8500 |
| Machine data | | | | | | | | |
| fiber time [s] | 41 | 44 | 42 | n.d. | n.d. | 35 | 35 | 43 |
| free rise density [g/L] | 22.9 | 22.6 | 22.6 | n.d. | n.d. | 22.9 | 23.2 | 22.5 |
| postexpansion [mm] at 17.5% overpacking | | | | | | | | |
| 3.5 min* | n.d. | n.d. | n.d. | n.d. | n.d. | 3.9 | 5.2 | n.d. |
| 3 min | 3.6 | 4.1 | 4.1 | n.d. | n.d. | n.d. | n.d. | 4.6 |
| 4 min | 2.1 | 2.4 | 2.5 | n.d. | n.d. | n.d. | n.d. | 2.8 |
| compressive strength [$N/mm^2$] at 34 g/l | 0.157 | 0.156 | 0.155 | n.d. | n.d. | 0.120 | 0.124 | 0.150 |

*unlike with the above-reported method for determination of demolding, these values were determined at 25% overpacking
n.d.: not determined

We claim:

1. A method of manufacturing a rigid polyurethane foam, the method comprising:
reacting a polyol component P) with a polyisocyanate in a closed mold,
wherein said polyol component P) comprises:
a) 1 to 70 wt % of at least one polyether polyol A) having an OH number in a range of from 300 to 500 mg KOH/g, comprising units based on mixtures having a functionality in a range of from 5.7 to 6.4 of 10 to 29.9 wt % of a monomer ai), 0.1 to 20 wt % of a monomer aii) and 60 to 89.9 wt % of a monomer aiii), wherein
ai) is sucrose,
aii) is selected from the group consisting of monopropylene glycol, diethylene glycol, triethylene glycol, dipropylene glycol, glycerol and mixtures thereof,
aiii) is solely propylene oxide as alkylene oxide,
wherein the sum total of ai), aii) and/or aiii) adds up to 100 wt %,
b) 1 to 50 wt % of at least one polyether polyol B) having an OH number in a range of from 300 to 500 mg KOH/g, comprising units based on mixtures having a functionality in a range of from 3.0 to 5.0 of monomers bi) and bii),
the at least one polyether polyol B) being obtained under catalysis with at least one of imidazole, trimethylamine, N, N-dimethylcyclohexylamine or dimethylethanolamine, wherein
bi) is selected from the group consisting of 2,3-tolylenediamine, 3,4-tolylenediamine, 2,4-tolylenediamine, 2,5-tolylenediamine, 2,6-tolylenediamine and mixtures thereof,
bii) is solely propylene oxide as alkylene oxide,
wherein at least one polyether polyol B) is prepared with propylene oxide as the sole alkylene oxide,
c) 1 to 12 wt % of at least one polyether polyol C) having an OH number in a range of from 100 to 290 mg KOH/g, comprising units based on mixtures having a functionality in a range of from 2.8 to 5.0 of monomers ci) and cii), wherein
ci) is selected from the group consisting of ethylenediamine, 1,3-propylenediamine, 1,3-butylenediamine, 1,4-butylenediamine, 1,2-hexamethylenediamine, 1,3-hexamethylenediamine, 1,4-hexamethylenediamine, 1,5-hexamethylenediamine, 1,6-hexamethylenediamine, phenylenediamines, 2,3-tolylenediamine, 3,4-tolylenediamine, 2,4-tolylenediamine, 2,5-tolylenediamine, 2,6-tolylenediamine, 4,4'-diaminodiphenylmethane, 2,4'-diaminodiphenylmethane, 2,2'-diaminodiphenylmethane, glycerol, trimethylolpropane, monopropylene glycol, diethylene glycol, triethylene glycol, dipropylene glycol and mixtures thereof,
cii) is selected from the group consisting of ethylene oxide, propylene oxide, butylene oxide and mixtures thereof as alkylene oxides, d) 0.1 to 10 wt % of at least one catalyst D), e) 0.1 to 10 wt % of at least one auxiliary and/or added substance E), and f) 0 to 10 wt % of at least one blowing agent F), wherein the sum total of components A), B), C), D), E) and, when present, F) adds up to 100 wt %.

2. The method of claim 1, wherein said polyol component P) comprises:
- a) at least one polyether polyol A) having an OH number in a range of from 300 to 500 mg KOH/g, comprising units based on mixtures having a functionality in a range of from 5.7 to 6.1 of the monomers ai), aii) and aiii), wherein
  - ai) is sucrose,
  - aii) is selected from the group consisting of monopropylene glycol, diethylene glycol, triethylene glycol, dipropylene glycol, glycerol and mixtures thereof,
  - aiii) is solely propylene oxide as alkylene oxide,
- b) at least one polyether polyol B) having an OH number in a range of from 300 to 500 mg KOH/g, comprising units based on mixtures having a functionality in a range of from 3.0 to 5.0 of the monomers bi) and bii), wherein
  - bi) is selected from the group consisting of 2,3-tolylenediamine, 3,4-tolylenediamine, 2,4-tolylenediamine, 2,5-tolylenediamine, 2,6-tolylenediamine and mixtures thereof,
  - bii) is solely propylene oxide as alkylene oxide,
  - or mixtures of bi) and bii),
- c) at least one polyether polyol C) having an OH number in a range of from 100 to 290 mg KOH/g, comprising units based on mixtures having a functionality in a range of from 2.8 to 5.0 of the monomers ci) and cii), wherein
  - ci) is selected from the group consisting of 2,3-tolylenediamine, 3,4-tolylenediamine, 2,4-tolylenediamine, 2,5-tolylenediamine, 2,6-tolylenediamine, monopropylene glycol, diethylene glycol, triethylene glycol, dipropylene glycol, glycerol and mixtures thereof,
  - cii) is ethylene oxide and/or propylene oxide as alkylene oxides.

3. The method of claim 1, wherein said polyol component P) comprises:
- a) at least one polyether polyol A) having an OH number in a range of from 300 to 500 mg KOH/g, consisting of units based on mixtures having a functionality in a range of from 5.7 to 6.1 of the monomers ai), aii) and aiii), wherein
  - ai) is sucrose,
  - aii) is selected from the group consisting of monopropylene glycol, diethylene glycol, triethylene glycol, dipropylene glycol, glycerol and mixtures thereof,
  - aiii) is solely propylene oxide as alkylene oxide,
- b) at least one polyether polyol B) having an OH number in a range of from 300 to 500 mg KOH/g, comprising units based on mixtures having a functionality in a range of from 3.0 to 5.0 of the monomers bi) and bii), wherein
  - bi) is selected from the group consisting of 2,3-tolylenediamine, 3,4-tolylenediamine, 2,4-tolylenediamine, 2,5-tolylenediamine, 2,6-tolylenediamine and mixtures thereof,
  - bii) is solely propylene oxide as alkylene oxide,
- c) at least one polyether polyol C) having an OH number in a range of from 100 to 290 mg KOH/g, comprising units based on mixtures having a functionality in a range of from 2.8 to 5.0 of the monomers ci) and cii), wherein
  - ci) is selected from the group consisting of 2,3-tolylenediamine, 3,4-tolylenediamine, 2,4-tolylenediamine, 2,5-tolylenediamine, 2,6-tolylenediamine, monopropylene glycol, diethylene glycol, triethylene glycol, dipropylene glycol, glycerol and mixtures thereof,
  - cii) is ethylene oxide and/or propylene oxide as alkylene oxides.

4. The method for preparing a rigid polyurethane foam according to claim 1, comprising:
- adding the at least one blowing agent F) to the polyol component P) of claim 1 to obtain a mixture of F) and P) and
- reacting:
  - I) said polyisocyanate with
  - II) the mixture of polyol component P) and the at least one blowing agent F) in a closed mold.

5. A rigid polyurethane foam, obtained by the method of claim 4.

6. The method according to claim 1, wherein in the at least one polyether polyol C)
- ci) is selected from the group consisting of 2,3-tolylenediamine, 3,4-tolylenediamine, 2,4-tolylenediamine, 2,5-tolylenediamine, 2,6-tolylenediamine, and mixtures thereof,
and
- cii) is propylene oxide.

7. The method according to claim 1, wherein said at least one polyether polyol A) is obtained under catalysis with imidazole.

8. The method according to claim 2, wherein said at least one polyether polyol A) is obtained under catalysis with imidazole as a catalyst.

9. The method according to claim 3, wherein said at least one polyether polyol A) is obtained under catalysis with imidazole as a catalyst.

10. The method according to claim 1, wherein said at least one polyether polyol A) has a functionality in a range of from 6.0 to 6.36.

* * * * *